United States Patent [19]

Shirai et al.

[11] Patent Number: 5,506,759
[45] Date of Patent: Apr. 9, 1996

[54] VEHICULAR HEADLAMP HAVING AIMING LEVELING DEVICE

[75] Inventors: Katutada Shirai; Hironori Tsukamoto, both of Shizuoka, Japan

[73] Assignee: Koito Manufacturing Co., Ltd., Tokyo, Japan

[21] Appl. No.: 303,730

[22] Filed: Sep. 9, 1994

[30]     Foreign Application Priority Data

Oct. 5, 1993  [JP]  Japan .................................. 5-248890
  Aug. 15, 1994 [JP]  Japan .................................. 6-191442

[51] Int. Cl.⁶ .................................................. G01C 9/28
[52] U.S. Cl. ............................. 362/66; 33/288; 33/379; 33/385
[58] Field of Search ............................ 33/288, 372, 373, 33/379, 384, 385; 362/61, 66, 101

[56]            References Cited

U.S. PATENT DOCUMENTS

| | | | |
|---|---|---|---|
| 778,131 | 12/1904 | James | 33/385 |
| 1,050,610 | 1/1913 | Burdick et al. | 33/385 |
| 1,963,805 | 11/1932 | Radke et al. | 33/89 |
| 4,660,128 | 4/1987 | Bergin et al. | 362/61 |
| 5,083,244 | 1/1992 | Shirai et al. | 362/61 |
| 5,107,407 | 4/1992 | Collot et al. | 362/66 |
| 5,140,503 | 8/1992 | Lisak | 362/61 |
| 5,151,849 | 9/1992 | Nagengast et al. | 362/61 |
| 5,221,137 | 6/1993 | Lovelace et al. | 362/61 |
| 5,253,154 | 10/1993 | McMahan et al. | 362/66 |
| 5,317,486 | 5/1994 | Schmitt | 362/66 |

FOREIGN PATENT DOCUMENTS

| | | | |
|---|---|---|---|
| 0016391 | 9/1912 | Denmark | 33/385 |
| 2086712 | 4/1970 | France . | |
| 591705 | 1/1934 | Germany . | |
| 348356 | 5/1931 | United Kingdom . | |

*Primary Examiner*—Denise L. Gromada
*Assistant Examiner*—Alan B. Cariaso
*Attorney, Agent, or Firm*—Sughrue, Mion, Zinn, Macpeak & Seas

[57]           ABSTRACT

A vehicular headlamp having an aiming leveling device in which a support table is formed so as to project from a reflector which is tiltable relatively to a lamp body, and a bubble tube support frame supporting a linear bubble tube is provided in such a manner that one end of the support frame is fixed to the support table while the other end of the support frame is held by a zero point adjusting means used to adjust the position of the other end of the support frame in the up/down direction, with the support frame extending substantially parallel to an optical axis, and with the quantity of tilting of the reflector in the up/down direction being indicated by the bubble tube. The zero point adjusting means is constituted by a leaf-spring-like bubble tube support frame formed by cutting and bending a metal sheet, a tapped hole provided in the bubble tube support frame and extending in the up/down direction, and a zero point adjustment screw screwed into the tapped hole while penetrating the bubble tube support frame in the up/down direction and with the butt end surface of the zero point adjustment screw pressed against a screw-contact surface of a reflector. The inclination of the bubble tube support frame (linear bubble tube) can be adjusted by rotating the zero point adjustment screw to thereby change the quantity of reflector-side projection of the zero point adjustment screw.

12 Claims, 11 Drawing Sheets

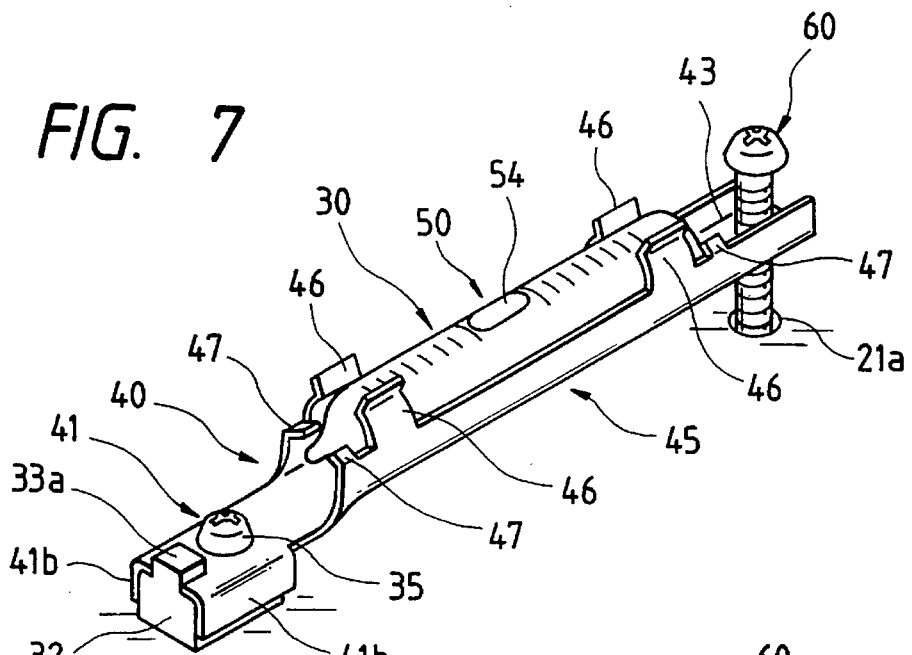
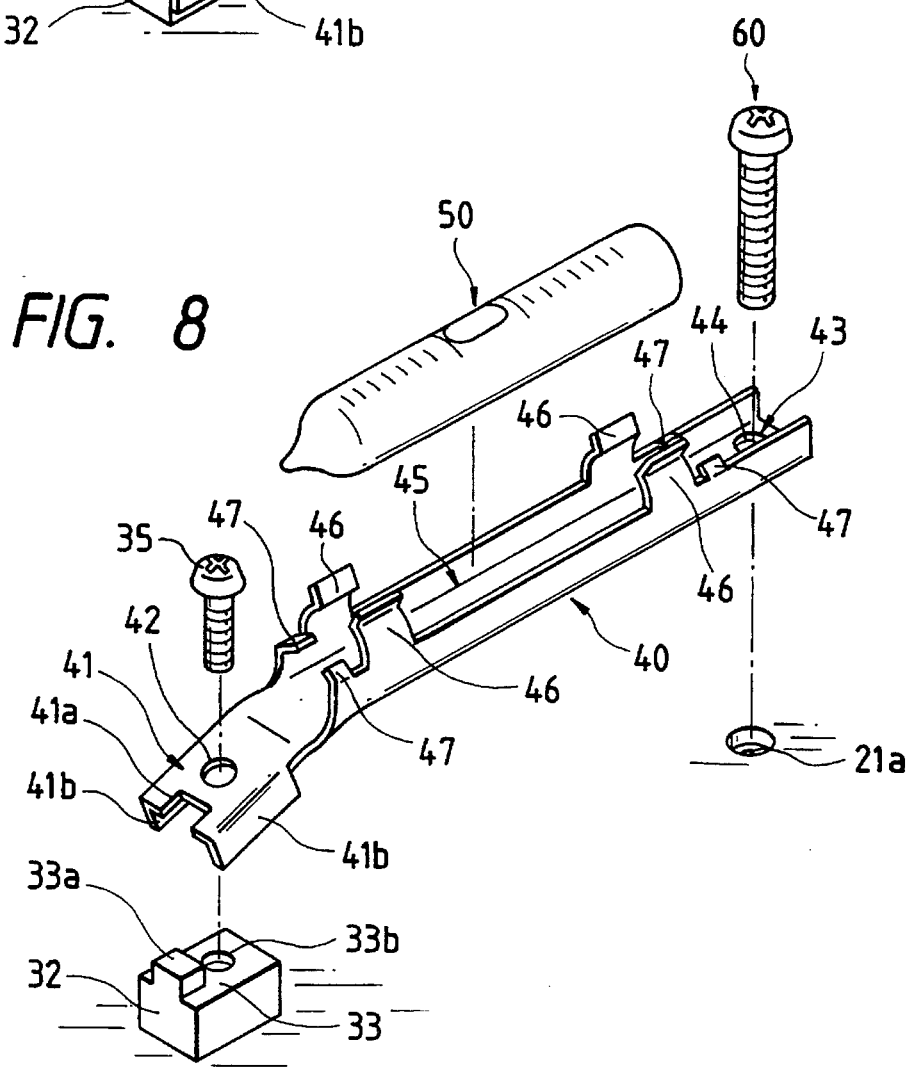

5,506,759

VEHICULAR HEADLAMP HAVING AIMING LEVELING DEVICE

BACKGROUND OF THE INVENTION

The present invention relates to a vehicular headlamp having an aiming leveling device, which is mounted on a reflector in the case of a movable-reflector type headlamp or mounted on a lamp body-reflector unit in the case of a movable-unit type headlamp, and which functions as an inclination indicator for detecting and indicating the irradiation angle of the headlamp in the vertical direction.

In a conventional aiming leveling device for a vehicular headlamp as disclosed, for example, in commonly assigned U.S. Pat. No. 5,083,244, as shown in FIGS. 1 to 3, a vehicular headlamp of movable-reflector type includes a reflector 2 on which is mounted a bulb 3. The reflector 2 is tiltably supported on a lamp body 1, which defines a reference member. The tilt angle of the reflector 2 in the vertical direction of the reflector 2 is indicated by an aiming leveling device 4 mounted on the reflector 2.

As shown in FIGS. 2 and 3, the aiming leveling device 4 is constituted by a case 5 having a vessel-like shape opening upward, a linear bubble tube 7, and a cover 6 acting as a bubble tube support frame, suspending and supporting the bubble tube 7. The cover 6 is installed on the case 5 in such a manner that the inclination angle of the cover 6 can be adjusted. Reference numeral 8a represents a zero point adjustment screw; 8b, a compression spring; and 9a and 9b, concave and convex engagement portions between the cover 6 and the case 5.

The cover 6 is held in position by the spring 8b and the screw 8a in such a manner that the angle of inclination of the cover 6 can be adjusted by rotating the screw 8a. Accordingly, it is possible to adjust the position of a bubble in the bubble tube 7, that is, to adjust the zero point of the aiming leveling device.

Reference letter L in FIG. 1 indicates the optical axis of the headlamp. In FIG. 3, reference numeral 2a indicates a plate-like extended portion formed on the reflector 2 for mounting thereon the aiming leveling device, and reference numeral 1a represents an aperture portion provided in the lamp body 1. A transparent cap 1b is attached to this opening portion 1a so that the scale of the aiming leveling device 4 can be read through this transparent cap 1b.

However, the conventional aiming leveling device 4 thus constructed has a complicated structure in that the concave and convex engagement portions 9a and 9b for engaging and holding the case 5 are formed between the cover 6 and the case 5, and the compression spring 8b is required for applying a spring bias to the cover.

An aiming leveling device having a simplified structure is disclosed in commonly assigned U.S. patent application Ser. No. 08/012,777 now U.S. Pat. No. 5,337,222. In the proposed aiming leveling device, as shown in FIG. 4, a bubble tube support frame a is formed by cutting and bending a metal leaf spring body into a predetermined shape. One end $a_1$ of the support frame a is fixed to a support mount b, with the other end $a_2$ free to spring upward, while the other end $a_2$ is received by a head portion $c_1$ of a zero point adjustment screw c screwed into the support table b in such a manner that a bubble tube d can be held substantially horizontally together with the bubble tube support frame a.

However, even in the proposed aiming leveling device according to U.S. patent application No. 08/012,777 now U.S. Pat. No. 5,337,222 described above, since the spring movement acting on the rear side of the bubble tube support frame a is stopped by the head portion $c_1$ of the zero point adjustment screw c, a force always acts on the screw engagement portion $b_1$ of the support table b in the upward direction, that is, in the direction urging the screw to come off.

In addition, an inertial load caused by the up/down motion accompanying the running of a motor vehicle also acts on this screw engagement portion $b_1$. Since the support table b is made of synthetic resin while the screw c is made of metal, the screw engagement portion $b_1$ tends wear and be damaged in long-term use. Thus, there is a problem in that the screw engagement portion may over time become unable to properly perform its designated function.

SUMMARY OF THE INVENTION

The present invention has been developed in consideration of the foregoing problems of the aforementioned conventional and proposed aiming leveling devices. Accordingly, an object of the present invention is to provide an aiming leveling device for use in a vehicular headlamp which has a simplified structure and which is superior in durability.

The foregoing and other objects can be achieved by the provision of a vehicular headlamp having an aiming leveling device which, according to the present invention, includes a support table formed so as to project from a reflector supported tiltably relative to a reference member, a bubble tube support frame extending substantially parallel to an optical axis established by the reflector, the bubble tube support frame having one end fixed to the support table and the other end held by a zero point adjusting means, with the position of the other end being adjustable in the vertical direction relative to the reflector, and with the angle of tilting of the reflector in the vertical direction being indicated by the bubble tube.

In the aiming leveling device according to the invention, the zero point adjusting means is constituted by a leaf-spring-like bubble tube support frame formed integrally by cutting and bending a metal sheet. A tapped hole is provided in the bubble tube support frame extending in the vertical direction, and a zero point adjustment screw made of metal is screwed into the tapped hole while penetrating the bubble tube support frame in the vertical direction, with a butt end surface thereof (i.e., the end surface of the screw at the end opposite the head) pressed against a screw-contact surface on the reflector side.

Further, in the aiming leveling device of the invention a circumferential portion of the tapped hole of the bubble tube support frame has a sunken shape, and a bonding agent for preventing the zero point adjustment screw from rotating is filled in the sunken portion.

Furthermore, according to the aiming leveling device of the invention, the screw-contact surface on the reflector side which the zero point adjustment screw contacts has a plate-like sunken portion, and a bonding agent for preventing the zero point adjustment screw from rotating is filled in the sunken portion.

One end of the leaf-spring-like bubble tube support frame supporting the linear bubble tube is fixed to the support table, while the length of the reflector-side projection of the zero point adjustment screw screwed into the other end of the support frame is set to a predetermined value. Accordingly, the zero point adjustment screw is urged by a spring force so that the butt end surface of the screw is pressed against a screw-contact surface on the reflector side. If the zero point adjustment screw is rotated to change the length of the reflector-side projection of the zero point adjustment screw, the distance between the other end of the bubble tube support frame and the screw-contact surface on the reflector side is changed so as to change the angle of inclination of the bubble tube support frame, that is, to change the angle of inclination of the bubble tube.

Since the bubble tube support frame is formed by cutting and bending a single metal sheet, it is possible to obtain a desired complicated shape, which cannot be obtained by molding of synthetic resin.

Since the bubble tube support frame and the zero point adjustment screw are made of metal, the tapped hole in which the zero point adjustment screw is engaged is protected from wear and damage.

Further, a bonding agent filled in the plate-like sunken portion surrounding the tapped hole bonds firmly fixes the zero point adjustment screw with the tapped hole. Moreover, the bonding agent filled in a plate-like sunken portion provided with the screw-contact surface bonds and fixes the zero point adjustment screw with the screw-contact surface so that the zero point adjustment screw is prevented from rotating freely.

Additionally, although the spring force of the bubble tube support frame acts on the screw-contact surface on the reflector side through the zero point adjustment screw, the spring force of the bubble tube support frame is dispersed by the bonding agent layer filled in the region around the butt end surface when the spring force acts on the screw-contact surface.

BRIEF DESCRIPTION OF THE DRAWINGS

FIG. 7 is a perspective view of an aiming leveling device;

FIG. 8 is an exploded perspective view of the same aiming leveling device;

DESCRIPTION OF THE PREFERRED EMBODIMENTS

Preferred embodiments of the present invention will now be described with reference to the accompanying drawings.

Figure 1:
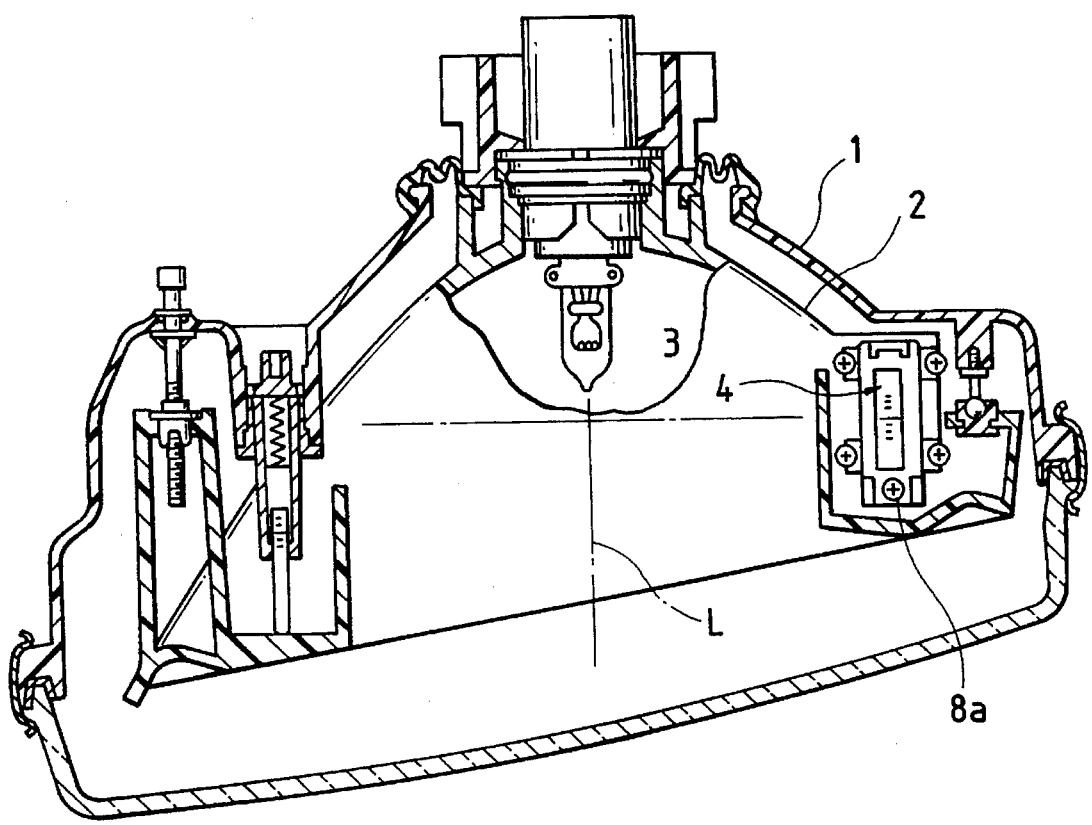
FIG. 1 is a horizontal sectional view of a vehicular headlamp mounted with a conventional aiming leveling device.
Figure 2:
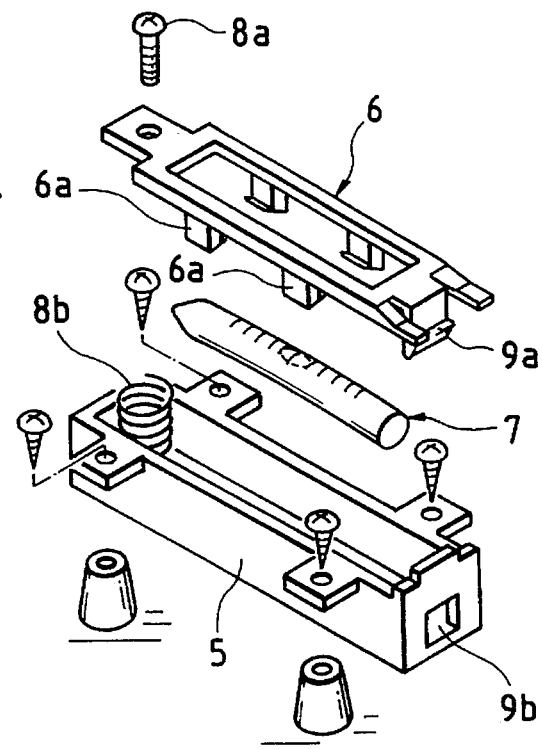
FIG. 2 is an exploded perspective view of the same aiming leveling device.
Figure 3:
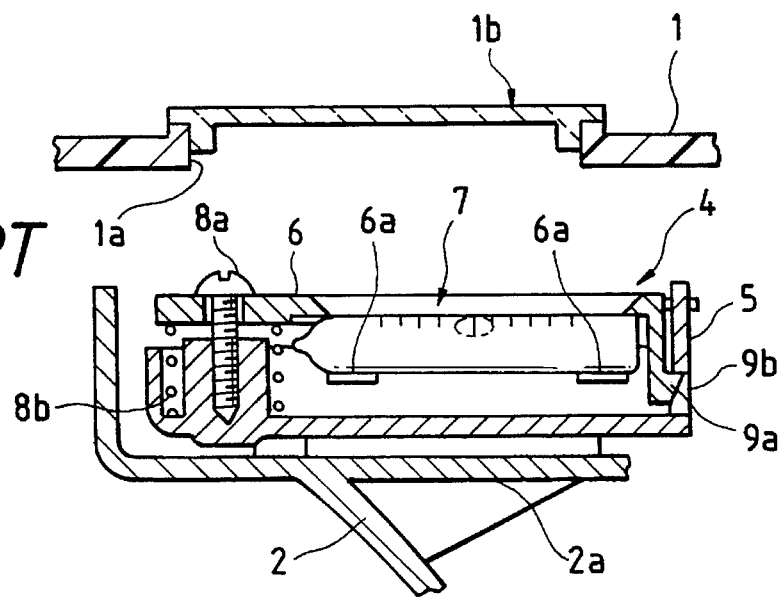
FIG. 3 is a longitudinal sectional view of the same aiming leveling device.
Figure 4:
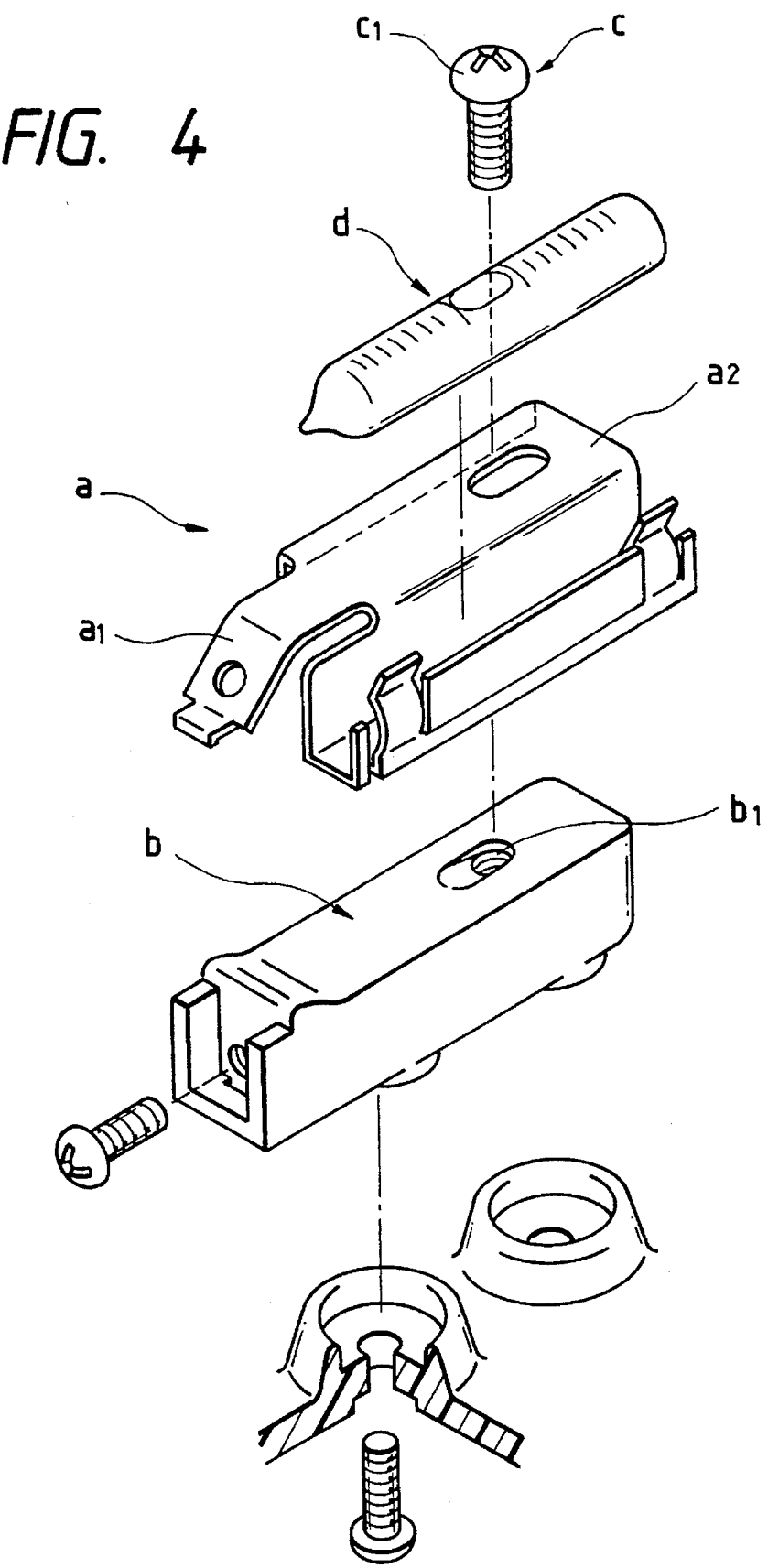
FIG. 4 is an exploded perspective view of an aiming leveling device relating to a previous application.
Figure 5:
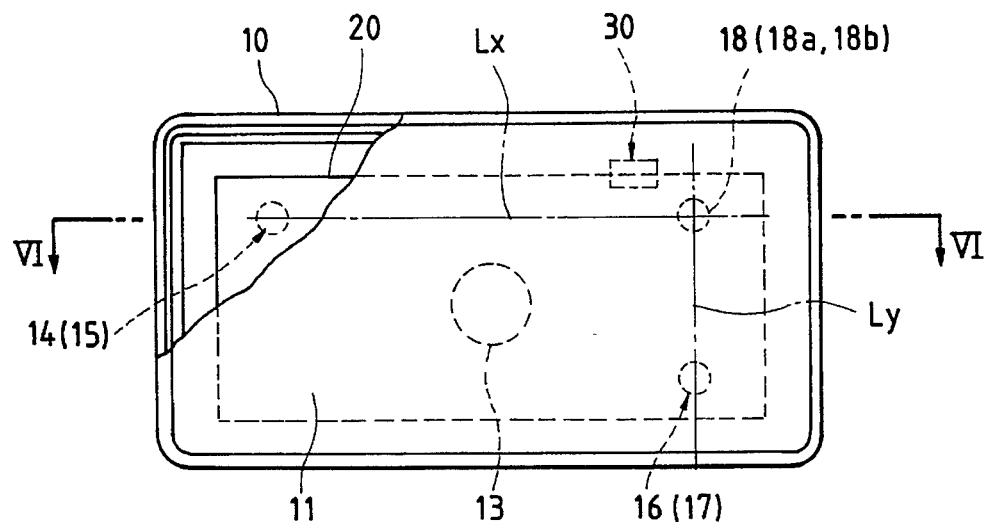
FIG. 5 is a front view of a movable-reflector type headlamp mounted with an aiming leveling device according to a first embodiment of the present invention.
Figure 6:
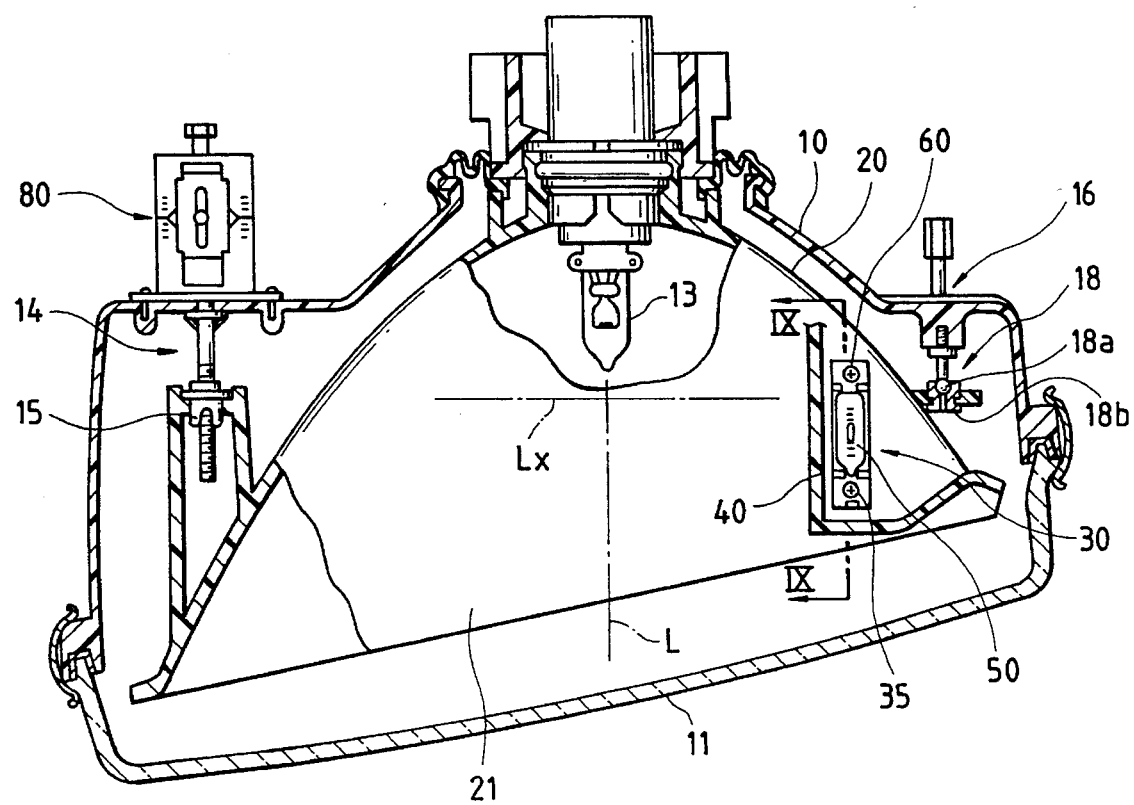
FIG. 6 is a horizontal sectional view of the same headlamp cut along a line VI—VI line shown in FIG. 5.
Figure 9:
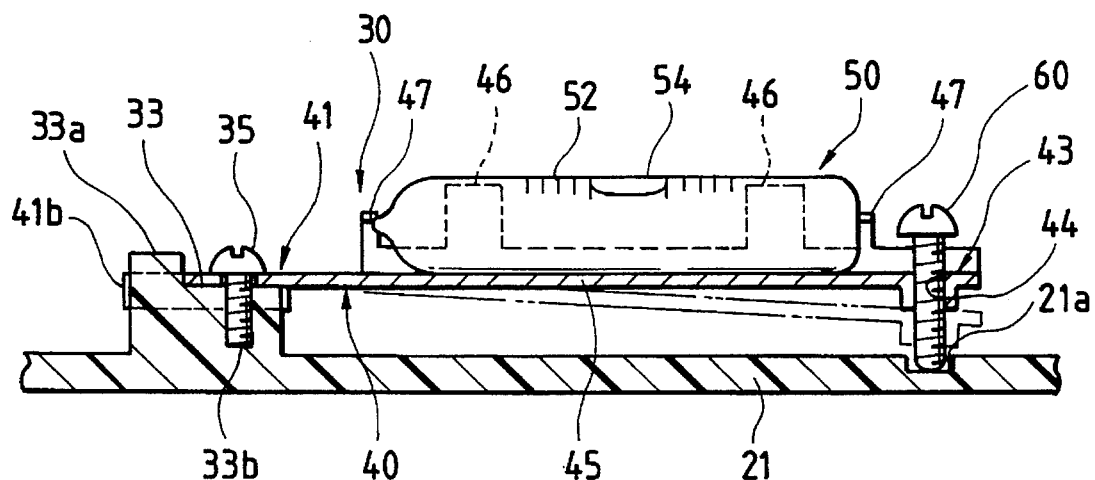
FIG. 9 is a longitudinal sectional view of the same aiming leveling device taken along a line IX—IX shown in FIG. 6.
Figure 10:
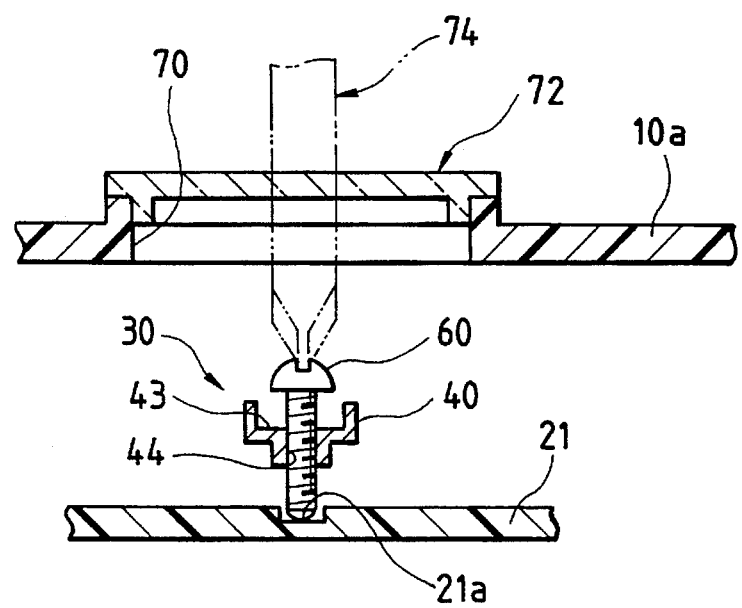
FIG. 10 is a cross-sectional view of the same aiming leveling device taken along a line X—X shown in FIG. 11.
Figure 11:
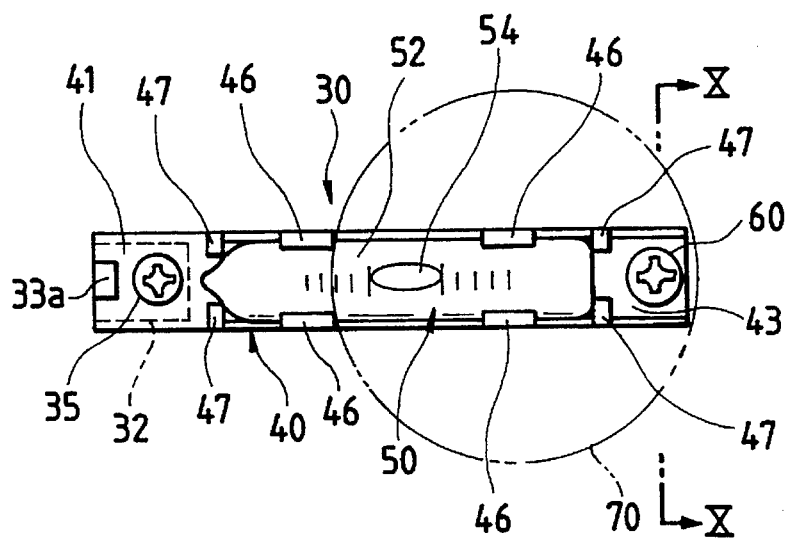
FIG. 11 is a plan view illustrating the arrangement of a view window and a zero point adjustment screw.

FIGS. 5 to 11 show a first embodiment of the present invention. Specifically, FIG. 5 is a front view of a movable-reflector type headlamp in which an aiming leveling device constructed according to a preferred embodiment of the present invention is installed, FIG. 6 is a horizontal sectional view of the same headlamp (sectional view taken on line VI—VI in FIG. 5), FIG. 7 is a perspective view of an aiming leveling device, FIG. 8 an exploded perspective view of the same aiming leveling device, FIG. 9 a longitudinal sectional view of the same aiming leveling device shown attached to a reflector (sectional view taken on line IX—IX in FIG. 6), FIG. 10 is a cross-sectional view of the same aiming leveling device (sectional view taken on line X—X in FIG. 11), and FIG. 11 is a plan view showing the positional relationship between a zero point adjustment screw and a viewing window.

In these drawings, reference numeral 10 represents a vessel-like lamp body. In this lamp body 10, a parabolic reflector 20 is tiltably supported by two aiming screws 14 and 16 and a ball joint 18. The screws 14 and 16 penetrate the rear wall of the lamp body 10 and are supported rotatably by their respective penetrating portions. The front end portions of the screws are screwed into brackets 15 and 17 fitted onto the back of the reflector 20. The ball joint 18 has a ball portion 18a projecting forward from the rear wall of the lamp body 10 and engaging a socket portion 18b on the rear of the reflector 20. In this structure, the nuts 15 and 17 are moved in the front/rear direction along the screws 14 and 16 by rotation of the screws 14 and 16, so that the reflector 20 tilts around a vertical axis Ly and a horizontal axis Lx. Reference numeral 11 represents a front lens, and 13, a bulb, which is a light source, inserted into a bulb insertion hole of the reflector 20.

The reflector 20 is made of synthetic resin such as PPS resin.

An aiming leveling device 30 for detecting the inclination angle in the vertical direction of the reflector 20, i.e., the quantity of inclination in the vertical direction of an optical axis L of the headlamp, is attached to an upper wall 21 of the reflector 20.

As best shown in FIGS. 7 and 8, the aiming leveling device 30 is constituted by a support table 32 formed so as to project from the reflector upper wall 21, a leaf-spring-like bubble tube support frame 40 swingably supported on this support table 32, a linear bubble tube 50 supported by the support frame 40, and a zero point adjustment screw 60 for adjusting the inclination of the support frame 40, that is, for adjusting the zero point of the bubble tube 50.

The support table 32 has the shape of a rectangular block, and is formed integrally with the reflector upper wall 21. A flat support frame holding surface 33 for holding the front end portion of the support frame 40 is formed on the upper surface of the support table 32. This holding surface 33 has a convex engagement portion 33a which engages with a top end engagement concave portion 41a on the support frame 40 side, and a hole 33b into which a fixing screw 35 is screwed.

A sunken screw-contact surface 21a contacting the butt end surface of the metal zero point adjustment screw 60 is provided on the reflector upper wall 21. The support frame 40 mounted on the support table 32 is a single body formed in a shape extending in the front/rear direction by cutting and bending a single metal sheet. The bubble tube 50 is supported by a bubble tube holding area 45 formed in a center portion in the front/rear direction of the support frame 40.

Reference numerals 46 represent four bubble tube holding arms provided oppositely to the right and left sides of the bubble tube holding area 45, and 47 positioning bent pieces contacting the front and rear end portions of the bubble tube 50 and used to perform positioning of the bubble tube 50 in the front/rear direction.

On the front end of the support frame 40 there is formed a rectangular planar area 41 inclined forward and downward relative to the bubble tube holding area 45, engaging the engagement convex portion 33a of the support table 32, and being held by the holding surface 33. In the left and right side portions of this rectangular planar area 41, there are formed downward bent portions 41b which engage the left and right side surfaces of the support table 32 to perform positioning of the planar area 41 in the lateral direction relative to the support table 32. Reference numeral 42 represents a fixing screw insertion hole provided in the planar area 41.

On the other hand, on the rear side of the support frame 40, a planar area 43 for receiving the zero point adjustment screw is formed at a level even with the bubble tube holding area 45. In this planar area 43, a tapped hole 44 into which the zero point adjustment screw 60 is screwed is formed by burring. The butt end surface of the zero point adjustment screw 60 screwed into the tapped hole 44 is urged against the screw-contact surface 21a of the reflector upper wall 21. By rotating and adjusting the zero point adjustment screw 60, the zero point of the aiming leveling device 30 is adjusted.

That is, since the bubble tube holding area 45 and the planar area 43 are formed with shapes inclined relative to the planar area 41, when the front-end-side planar area 41 of the support frame 40 is fixed to the support table 32 by a metal fixing screw 35, the rear side of the support frame 40 is inclined downward obliquely, as shown by a broken line in FIG. 9. Subsequently, the zero point adjustment screw 60 is rotated against the spring force of the support frame 40 to thereby set the length of the zero point adjustment screw 60 projecting downward from the support frame 40 to a predetermined value, whereby the support frame 40 is approximately horizontal relative to the reflector upper wall 21. The butt end surface of the zero point adjustment screw 60 presses against the screw-contact surface 21a on the reflector so that the support frame 40 is fixed and firmly held to the reflector upper wall 21.

By rotating the zero point adjustment screw 60 to change the length of projection of the zero point adjustment screw 60 downward over the frame 40, the height of the support frame 40 on the rear side is adjusted in the vertical direction, that is, the angle of inclination of the bubble tube 50 is adjusted. Accordingly, by rotating the zero point adjustment screw 60 until the bubble 54 moves to the zero point on a scale 52 formed in the bubble tube 50, the zero point of the aiming leveling device 30 is adjusted easily.

In this embodiment, since the front-end-side planar area 41 is inclined at a predetermined angle relative to the bubble tube holding area 45 and the rear-end-side planar area 43, when the aiming leveling device 30 is attached to the reflector 20 and the zero point adjustment is performed, the urging force of the bubble tube support frame 40 against the reflector upper wall 21 (the pressing force of the zero point adjustment screw 60 against the screw-contact surface 21a) is always constant. Accordingly, uniformity of the attachment force of the aiming leveling device to the headlamp is ensured.

On an upper wall 10a of the lamp body 10, as shown in FIGS. 10 and 11, a circular opening portion 70 is formed above the aiming leveling device 30 attached to the reflector 20 and from the available movable region of the bubble 54 of the bubble tube 50 to the position where the zero point adjustment screw 60 is disposed. A detachable transparent cap 72 constituting a viewing window is attached to this opening portion 70. To adjust the zero point of the aiming leveling device 30, the cap 72 is detached, and a screwdriver 74 (shown in FIG. 10) is inserted through the opening portion 70 to thereby rotate the screw 60.

Reference numeral 80 in FIG. 6 represents an inclination detector for detecting the quantity of inclination in the horizontal direction of the reflector 20, i.e., the inclination angle in the horizontal direction of the optical axis L of the headlamp. The inclination detector 80 is fixed to the rear wall of the lamp body, and installed in the area of the aiming screw 14 projecting from the rear of the lamp body.

Figure 12:
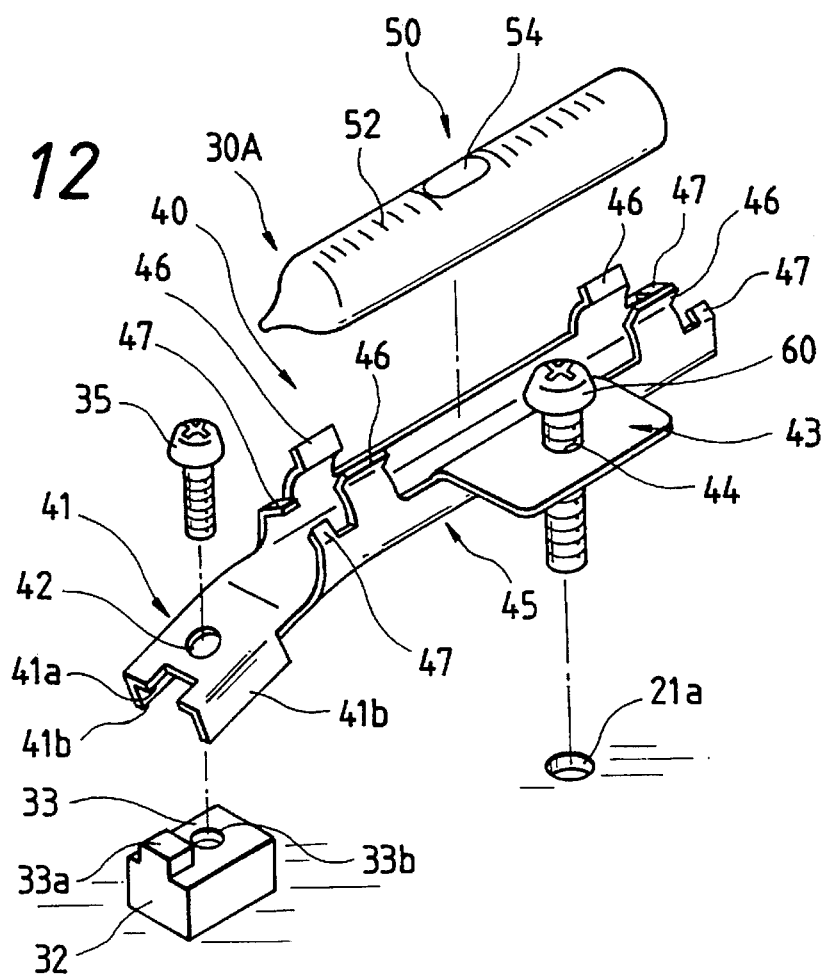
FIG. 12 is an exploded perspective view of an aiming leveling device according to a second embodiment of the present invention.

FIG. 12 is an exploded perspective view of an aiming leveling device according to a second embodiment of the present invention.

In an aiming leveling device 30A in this embodiment, a lip-like horizontally extending portion 43 is bent-formed at the upper edge of one side of a bubble tube holding area 45. That is, a planar area (horizontally extending portion) 43 for receiving a zero point adjustment screw is provided at the side of a support frame 40. Accordingly, there is an advantage that the length of the support frame 40 in the longitudinal direction is reduced. The other parts are the same as those in the first embodiment, and are referenced correspondingly. Therefore, a further description of such elements is omitted.

Figure 13:
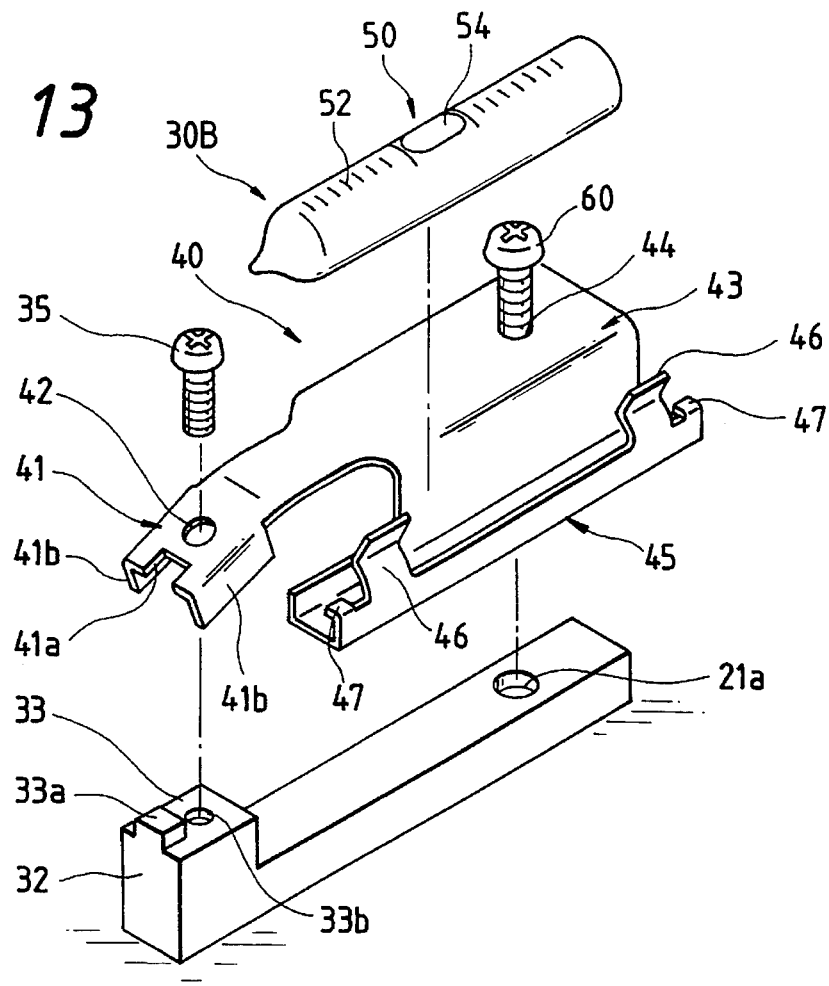
FIG. 13 is an exploded perspective view of an aiming leveling device according to a third embodiment of the present invention.

FIG. 13 is an exploded perspective view of an aiming leveling device according to a third embodiment of the present invention.

In an aiming leveling device 30B in this embodiment, a rear-end-side planar area 43, in which a zero point adjustment screw is disposed and which is elongated in the front/rear direction, is formed at the rear of a front-end-side planar area 41, and a bubble tube holding area 45 is formed at the side of the rear-end-side planar area 43. A support table 32 is formed so to extend substantially the entire length of a support frame 40, and a screw-contact surface 21a is formed on the rear end side of the support table 32. Being the same as those in the first embodiment, the other elements are referenced correspondingly and a further description thereof is omitted.

Figure 14:
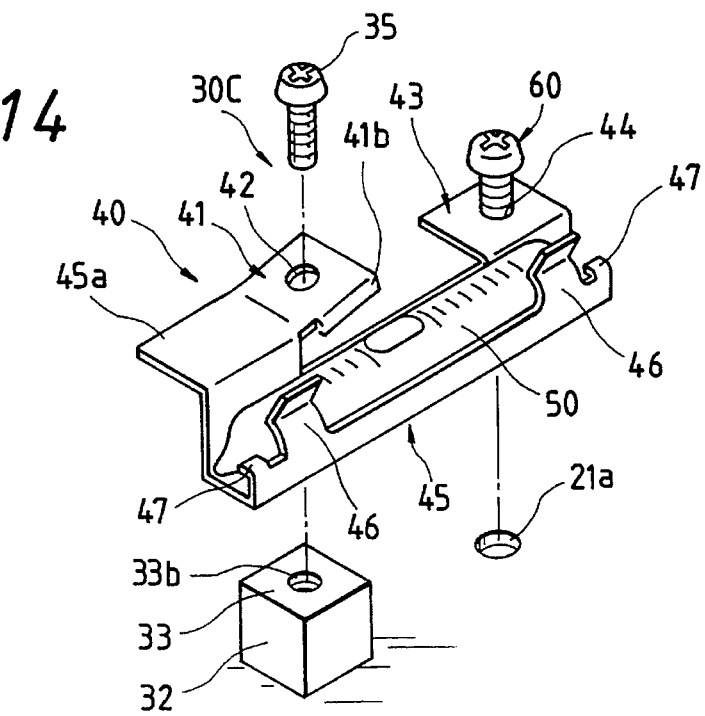
FIG. 14 is an exploded perspective view of an aiming leveling device according to a fourth embodiment of the present invention.

FIG. 14 is an exploded perspective view of an aiming leveling device according to a fourth embodiment of the present invention.

In the aiming leveling device 30C of this embodiment, an extending portion 45*a* having an inverted-L-shaped section is formed in the front of one side of a bubble tube holding area 45. A front-end-side planar area 41 is formed at the rear of this extending portion 45*a*, while a rear-end-side planar area 43 for disposing a zero point adjustment screw is formed at the rear of the side of the bubble tube holding area 45 in such a manner that the planar area 43 is lower in height than the front-end-side planar area 41. Both the front and rear planar areas 41 and 43 are provided within the region of the length in the longitudinal direction of the bubble tube support frame 40 so that the length in the longitudinal direction of the support frame 40 is made shorter than that in the above-described second embodiment. Being the same as those in the first embodiment, the other elements are referenced correspondingly and a further description thereof is omitted.

Figure 15:
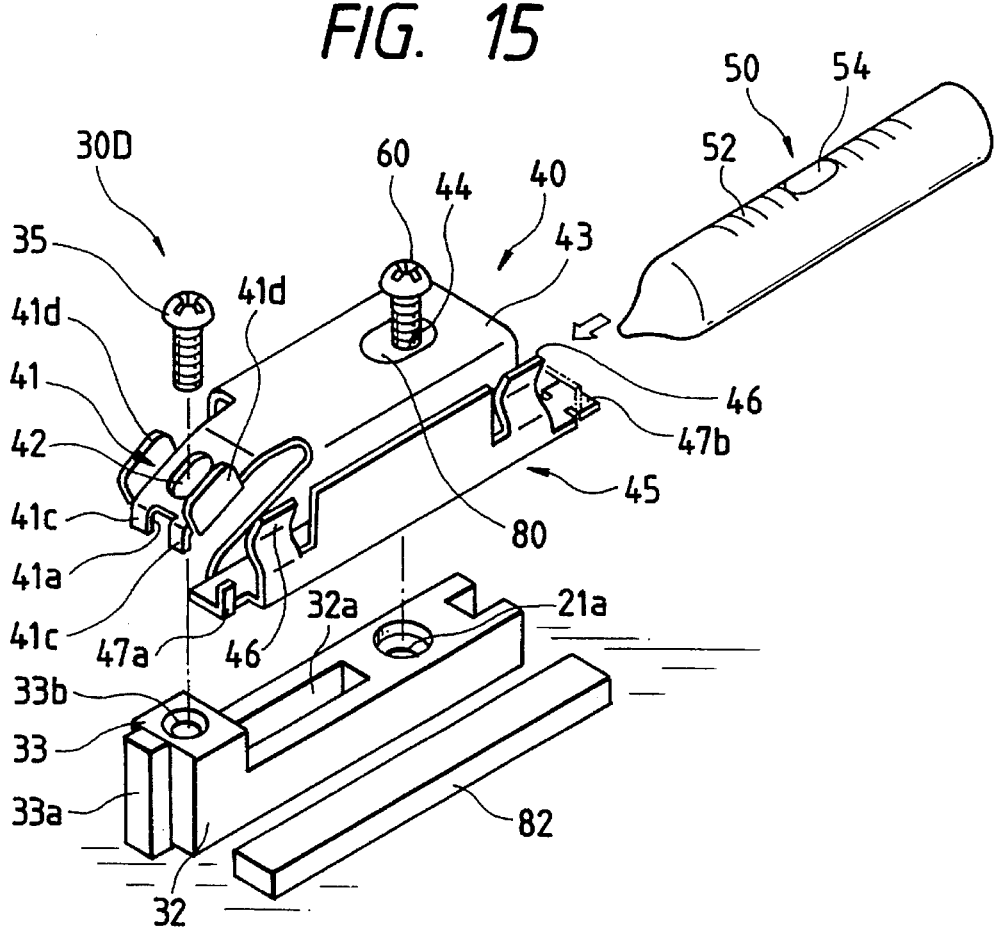
FIG. 15 is an exploded perspective view of an aiming leveling device according to a fifth embodiment of the present invention.
Figure 16:
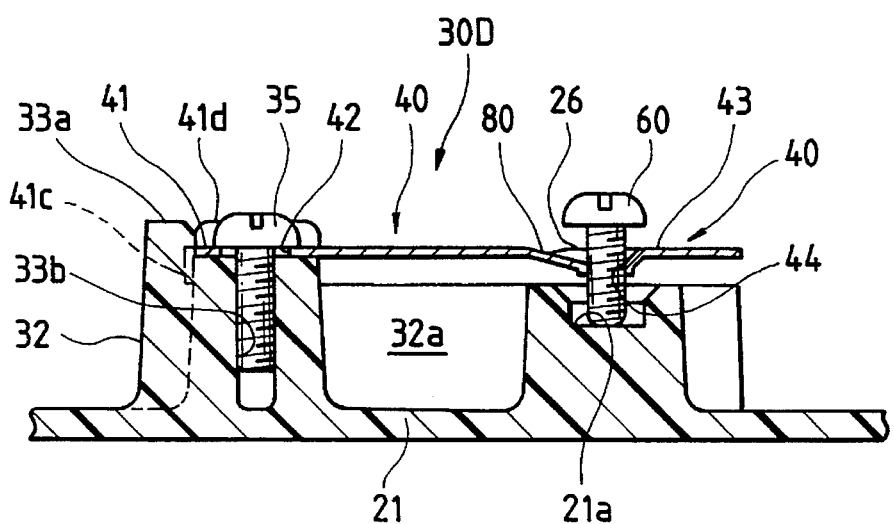
FIG. 16 is a longitudinal sectional view of the same aiming leveling device.

FIGS. 15 and 16 show an aiming leveling device according to a fifth embodiment of the present invention. FIG. 15 is an exploded perspective view of the same aiming leveling device, and FIG. 16 is a longitudinal sectional view of the same aiming leveling device.

In the aiming leveling device 30D in this embodiment, a circumferential portion 80 of a tapped hole 44 formed in a rear-end-side planar area 43 of a bubble tube support frame 40 is sunken, and a bonding agent for preventing a zero point adjustment screw 60 from rotating is filled in the sunken portion 80. Reference numeral 26 denotes a bonding agent layer of the bonding agent filled in and solidified in the sunken portion 80. That is, the zero point adjustment screw 60 screwed into the tapped hole 44 so as to project upward from the sunken portion 80 is fixedly bonded to the bubble tube support frame 40 by the bonding agent layer 26 in the sunken portion 80. Accordingly, the zero point adjustment screw 60 is prevented from rotating due to transmitted vibration during the running of the vehicle.

To perform the zero point adjustment, the zero point adjustment screw 60 is rotated relative to the bonding agent layer 26 fixedly held on the bubble tube support frame 40 (sunken portion 80) once the screw 60 is rotated with a screwdriver 74 with a force sufficiently great to overcome the bonding force of the bonding agent layer 26. Accordingly, it is possible to easily adjust the inclination angle of the support frame 40.

A fixing screw insertion hole 42 provided in a planar area 41 on the front end side of the bubble tube support frame 40 is formed as an elongated hole which extends in the front/rear direction. The elongated hole 42 is designed so that the support frame 40 can move in the front/rear direction relative to a fixing screw 35 to make the zero point adjustment screw 60 positioned to match a screw holding surface 21*a* when the support frame 40 is installed on the support table 32. That is, even if the position where the tapped hole 44 is formed is not so accurate, any such deviation is absorbed into this long hole 42. Thus, the attachment of the support frame 40 to the support table 32 is made easy.

In a front end portion of the planar area 41, there are formed a pair of lower bent portions 41*c*. These lower bent portions 41*c* extend downward from the support table 32, and a bubble tube holding area 45 is mounted on a support frame temporary setting table 82 formed so as to project from a reflector upper wall 21, so that the support frame 40 can be attached temporarily on the support table 32.

Reference numerals 41*d* represent bent portions extending vertically on the left and right side portions of the planar area 41 in order to increase the rigid strength of the planar area 41 as a whole. Reference numerals 47*a* and 47*b* represent bent pieces formed by cutting and bending upward the front and rear end portions of the bubble tube holding area 45 in order to perform positioning of a bubble tube 50 in the longitudinal direction.

In order to mount the bubble tube 50 in the holding area 45, as shown by the arrow in FIG. 15, the bubble tube 50 is inserted into the holding area 45 from the rear of the support frame 40, and in the position where the front end portion of the bubble tube 50 is brought into contact with the front-end-side bent piece 47*a*, the rear-end-side bent piece 47*b* is bent upward to support the rear end surface of the bubble tube 50, as shown by a broken line in FIG. 15. At the same time, a bonding agent is filled from above into a bubble tube holding portion constituted by holding arms 46 so as to fix the bubble tube 50. Reference numeral 32*a* represents an opening portion provided in the support table 32. The opening portion 32*a* is effective to conserve resin materials and to increase the resin density of the support table 32.

Being the same as those in the aforementioned embodiment, the other elements are referenced correspondingly and a further description of such elements is omitted.

Figure 17:
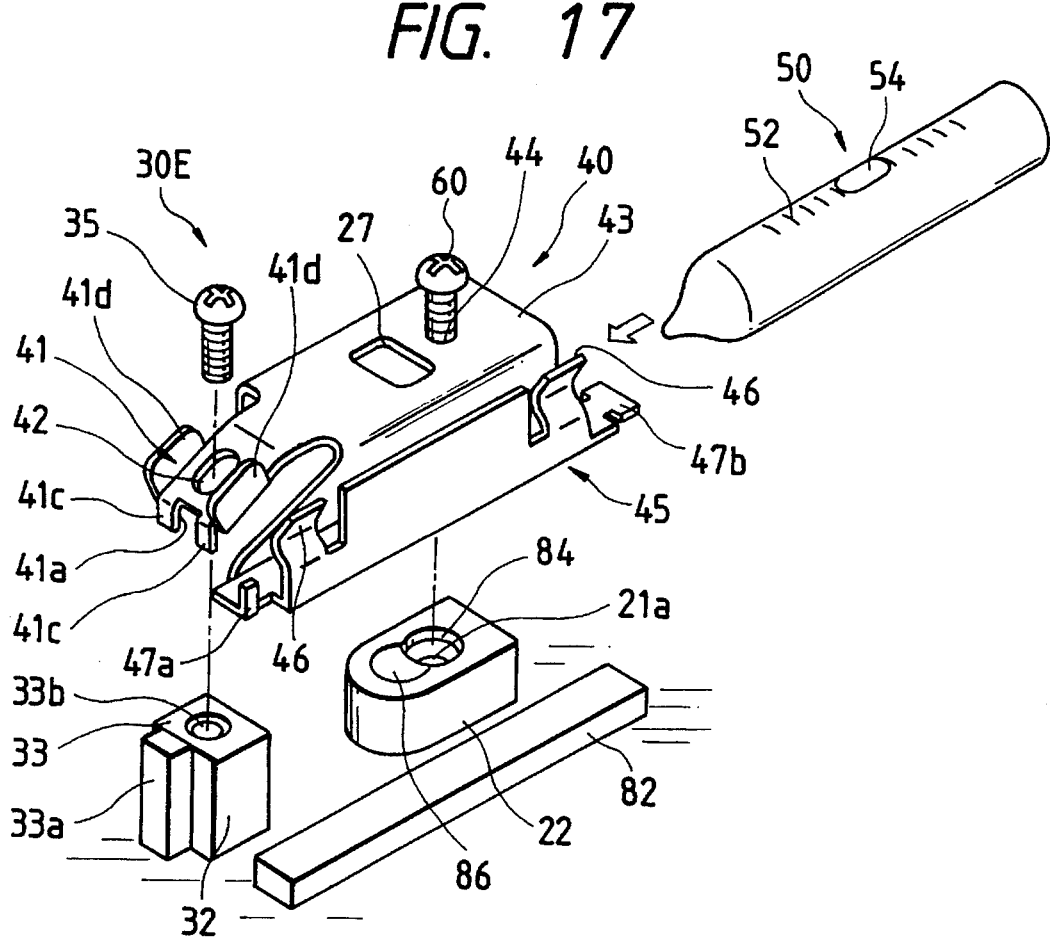
FIG. 17 is an exploded perspective view of an aiming leveling device according to a sixth embodiment of the present invention.
Figure 18:
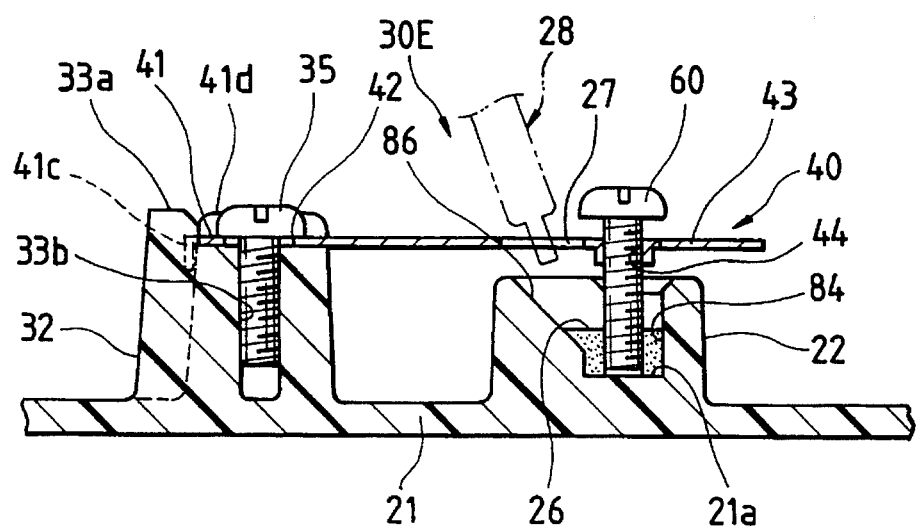
FIG. 18 is a longitudinal perspective view of the same aiming leveling device.

FIGS. 17 and 18 show an aiming leveling device according to a sixth embodiment of the present invention. FIG. 17 is an exploded perspective view of the same aiming leveling device, and FIG. 18 is a longitudinal sectional view of the same aiming leveling device.

In an aiming leveling device 30E in this embodiment, a support table 32 for supporting a front end portion of a bubble tube support frame 40 and a rectangular block-like screw holding table 22 for supporting a rear end portion of the bubble tube support frame 40 are formed so as to project from a reflector upper wall 21. A pit 84, which is a sunken portion, is provided in the screw holding table 22, and the bottom surface of the pit 84 forms a screw-contact surface 21*a*. A bonding agent is applied into the pit 84 so that a butt end surface of a zero point adjustment screw 60 is fixedly bonded to the pit 84 upon solidification of the bonding agent layer 26. Therefore, although vibration caused by the engine or accompanying the running of the vehicle may be transmitted to the zero point adjustment screw 60, there is no fear that such vibration will cause the zero point adjustment screw 60 to rotate relative to the tapped hole 44 and disturb the set angle of inclination of the bubble tube support frame 40.

This bonding agent layer 26 also has the function of expanding the contact area of the screw-contact surface 21 contacting the zero point adjustment screw 60 to thereby prevent the screw-contact surface 21*a* from being worn. That is, since the screw-contact surface 21*a* is made of a synthetic resin such as PPS resin while the screw 60 is made of metal, the portion of the screw-contact surface 21*a* contacting the butt end surface of the screw 60 might be worn, disturbing the set inclination angle of the bubble tube, if there were no bonding agent layer 26. However, the load acting on the screw-contact surface 21*a* through the screw 60, that is, the urging force caused by the leaf spring function of the bubble tube support frame 40, is dispersed by the bonding agent layer 26. That is, the load per unit area acting on the screw-contact surface 21a is reduced. Therefore, in this embodiment, the contact surface 21a is hardly worn. Accordingly, the inclination angle of the bubble tube support frame 40 is prevented from being disturbed.

Reference numeral 86 represents an inclined hole extending upward from the pit 84 for facilitating the filling of a bonding agent into the sunken portion (the pit 84). In addition, an opening 27 corresponding to the inclined hole 86 of the screw holding table 22 and for applying a bonding agent is provided in the position adjacent to the tapped hole 44 of the bubble tube support frame 40 so that a bonding agent can be injected into the inclined hole 86 (the pit 84) through the opening 27 by a bonding agent injecting device indicated by reference numeral 28 in FIG. 18.

Also in this embodiment, when the zero point adjustment is to be performed, the zero point adjustment screw 60 is rotated relative to the bonding agent layer 26 in the pit 84 with a screwdriver 74 with a force stronger than the bonding force of the bonding agent layer 26. Accordingly the inclination angle of the support frame 40 can easily be adjusted.

Being the same as those in the above-mentioned fifth embodiment, the other elements are referenced correspondingly and a further description about such elements is omitted.

In the above first to fourth embodiments, a bonding agent may be applied into the sunken screw-contact surface 21a so as to realize a structure in which the screw 60 is prevented from rotating freely.

Figure 19:
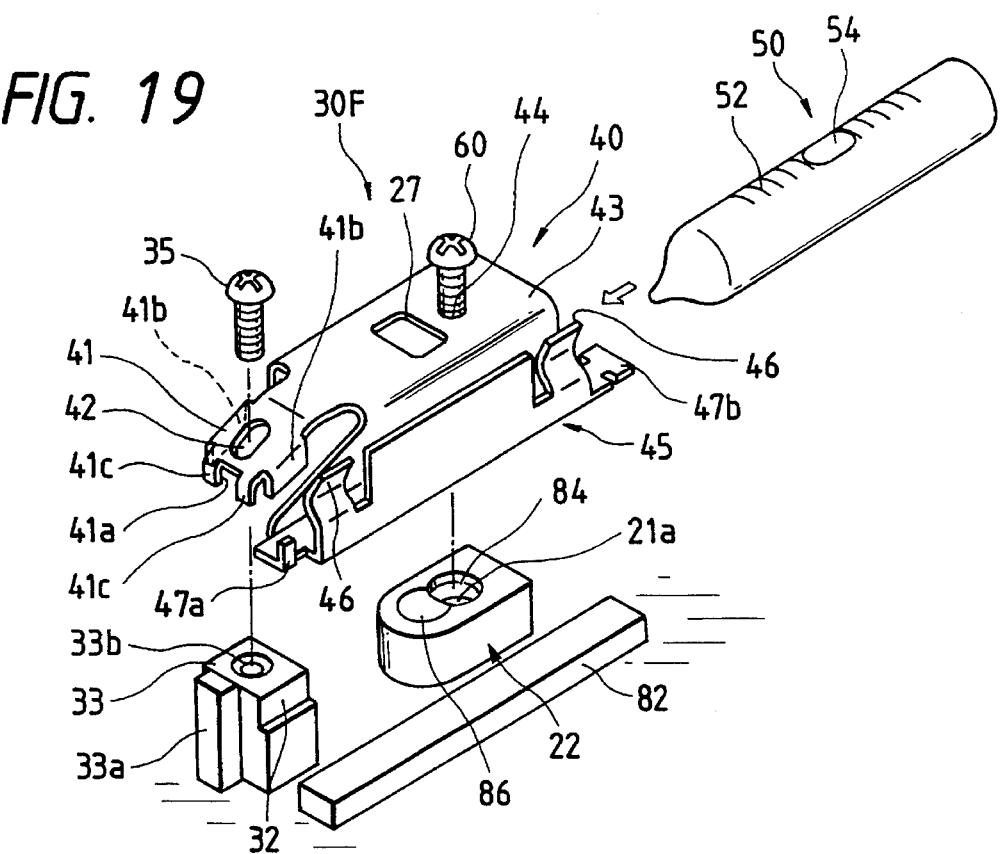
FIG. 19 is an exploded perspective view of an aiming leveling device according to a seventh embodiment of the present invention.
Figure 20:
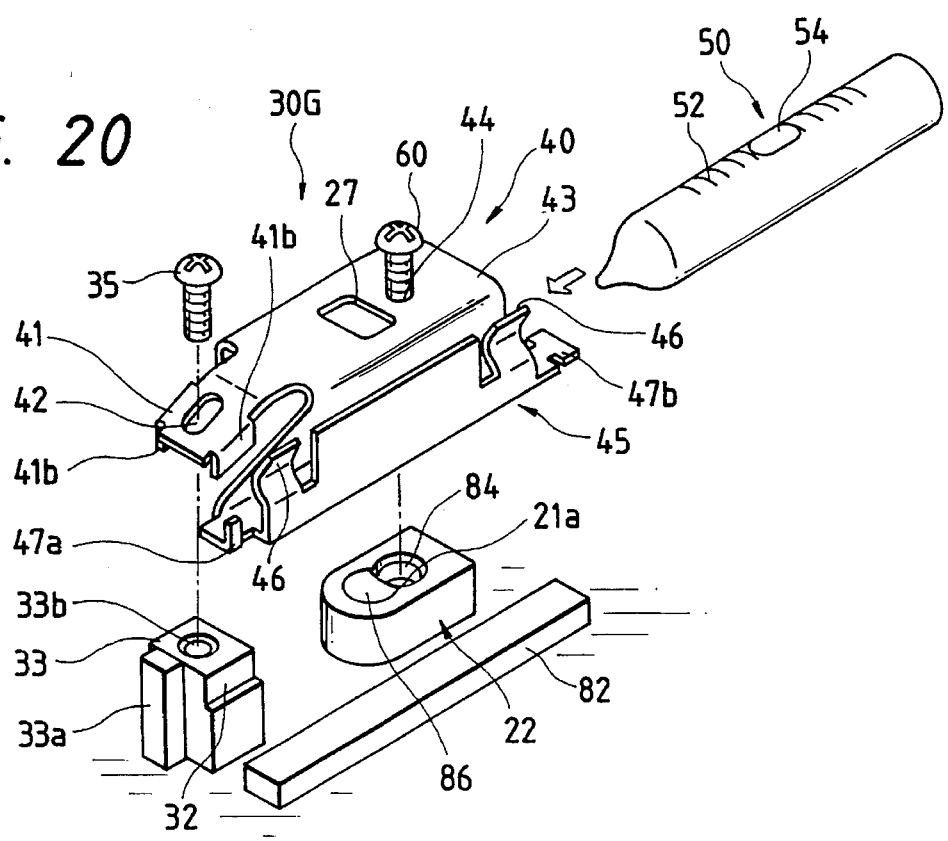
FIG. 20 is an exploded perspective view of an aiming leveling device according to an eighth embodiment of the present invention.

FIGS. 19 and 20 are exploded perspective views showing aiming leveling devices according to seventh and eighth embodiments of the present invention, respectively.

The aiming leveling device 30F of the seventh embodiment differs in structure from that of the above-mentioned sixth embodiment in that lower bent portions 41b bent downward vertically are formed at the left and right side portions of a front-end-side planar area 41 of a support frame 40 to thereby prevent the planar area 41 from being distorted. Being the same as those of the aiming leveling device 30E in the sixth embodiment, the other elements are referenced correspondingly and a further description about such elements is omitted.

In the aiming leveling device 30G in the eighth embodiment, no lower bent portion 41c engageable with an engagement convex portion 33a of a support table 32 as shown in the above-mentioned seventh embodiment is formed at a front end portion of a front-end-side planar area 41 of a support frame 40. Instead, lower bent portions 41b formed at the left and right side portions of the planar area 41 engage the left and right side surfaces of the support table 32 to thereby ensure the proper swing of the support frame 40.

Being the same as those of the aiming leveling device 30E in the sixth embodiment, the other elements are referenced correspondingly and a further description thereof is omitted.

Although in the above-described various embodiments the front-end-side planar area 41 fixed to the support table 32 and the rear-end-side planar area 43 for disposing the zero point adjustment screw are designed to be inclined so that the rear end side of the support frame 40 is urged against the reflector when the bubble tube holding area 45 is made substantially horizontal by performing zero point adjustment, the present invention is not limited to such a structure so long as the planar areas 41 and 43 are substantially parallel, and the bubble tube 50 supported by the bubble tube holding area 45 is inclined, for example, downward and rearward relative to the planar areas 41 and 43, to thereby urge the support frame 40 (press the zero point adjustment screw 60 against the reflector upper wall 21) when the zero point adjustment is performed.

Although aiming leveling devices applied to movable-reflector type headlamps are described in the above various embodiments, the present invention can be applied also to a movable-unit type headlamp in which a lamp body-reflector unit is tiltably supported by an aiming mechanism on a lamp housing, which is a reference member. That is, an aiming leveling device having a structure as in any of the above-mentioned embodiments may be attached to a support table projecting from an upper wall of a lamp body reflector unit of a movable-unit type headlamp.

As is apparent from the above description, in an aiming leveling device in a vehicular headlamp according to the present invention, a bubble tube support frame, which is one of the constituent parts of the aiming leveling device and which is supported by a support table to fixedly hold a bubble tube, is formed by cutting and bending a metal sheet. Accordingly, the support frame can be formed in a complicated shape which cannot be obtained by molding of synthetic resin. It is therefore possible to reduce the cost of manufacturing the aiming leveling device.

In addition, one end of the leaf-spring-like bubble tube support frame is fixed to the support table while the length of a reflector-side projection of a zero point adjustment screw screwed into the other end of the bubble tube support frame is set to a predetermined value, so that the other end is held in a manner so as to be urged against the reflector. Accordingly, it is possible to perform the zero point adjustment by rotating the zero point adjustment screw. Although the bubble tube support frame is made of metal, there is no fear that the tapped hole into which the zero point adjustment screw is screwed will be worn and damaged. The durability of the aiming leveling device is therefore ensured.

Further, by applying a bonding agent into a plate-like sunken portion surrounding the tapped hole, or by applying a bonding agent into a plate-like sunken portion surrounding a screw-contact surface, the zero point adjustment screw is prevented from rotating. Accordingly there is no fear that the aiming leveling device will get out of adjustment due to vibration or the like.

In addition, the spring force of the bubble tube support frame acting on the screw-contact surface on the reflector through the zero point adjustment screw is dispersed by the bonding agent layer filled in the screw-contact surface. Accordingly, the amount of wear of the screw-contact surface is reduced, and the aiming leveling device is prevented from getting out of adjustment due to frictional wearing of the screw-contact surface.

What is claimed is:

1. A vehicular headlamp comprising:
   a reflector tiltably supported relative to a reference member in horizontal and vertical directions of said reference member; and
   a leveling device attached to said reflector for measuring an amount of vertical deviation of a light beam from said headlamp, said leveling device comprising:
      a support frame tiltably supported on said reflector, wherein said support frame is a leaf spring, and wherein said leaf spring is biased toward said reflector;
      a bubble tube for indicating said amount of vertical deviation of said light beam, said support frame comprising a holding portion for engaging said bubble tube;
      a fixing screw passing through a hole formed in said support frame and screwed into a hole in said reflector for fixing one end of said support frame to said reflector; and an adjustment screw threadably engaged with a tapped hole formed in said support frame for adjusting an angular position of said support frame relative to said reflector with and against a biasing force of said leaf spring, said adjustment screw having a butt end surface portion pressed against and frictionally contacting said reflector.

2. The vehicular headlamp of claim 1, wherein said leaf spring comprises at least two substantially planar portions, one of said planar portions being inclined relative to another one of said planar portions in a direction toward said reflector, wherein the angular position of said support frame is adjusted by rotating said adjustment screw in a first direction to raise said support frame against the biasing force of said leaf spring, and in a second direction to lower said support frame with the biasing force of said leaf spring.

3. The vehicular headlamp of claim 1, wherein said holding portion of said support frame comprises a bent piece for preventing movement of said bubble tube in a front-to-rear direction of said bubble tube.

4. The vehicular headlamp of claim 1, wherein said reflector has a screw contacting surface formed in an upper wall thereof which contacts said butt end surface portion of said adjustment screw.

5. The vehicular headlamp of claim 1, wherein said reflector has an indented portion in which said butt end surface portion of said adjustment screw is received, and further comprising a bonding agent filled in said indented portion.

6. The vehicular headlamp of claim 1, wherein said bubble tube is slidably engaged with said holding portion of said support frame.

7. The vehicular headlamp of claim 1, wherein said holding portion of said support frame comprises two bent pieces for preventing movement of said bubble tube in a front-to-rear direction of said bubble tube.

8. The vehicular headlamp of claim 1, further comprising a support table supporting said support frame, said support table being formed on an upper surface of said reflector, said hole into which said fixing screw is screwed being formed in one end of said support table.

9. The vehicular headlamp of claim 1, wherein said support frame is a metal leaf spring, and wherein said metal leaf spring is bent so that the butt end surface portion of said adjustment screw is urged against said reflector when said bubble tube is substantially horizontal.

10. The vehicular headlamp of claim 1, wherein said holding portion is formed integrally with said leaf spring for engaging said bubble tube.

11. The vehicular headlamp of claim 1, wherein said holding portion comprises a plurality of holding arms.

12. A vehicular headlamp comprising:

a reflector tiltably supported relative to a reference member in horizontal and vertical directions of said reference member; and a leveling device attached to said reflector for measuring an amount of vertical deviation of a light beam from said headlamp, said leveling device comprising:

a metal leaf spring, a proximal end of said leaf spring being fixedly secured to said reflector, said leaf spring being provided with a tapped hole spaced from said proximal end;

an adjustment screw threadably engaged in said tapped hole so as to be pressed against and frictionally contact said reflector, said leaf spring being biased toward said reflector and maintained at a variable inclination with respect to said reflector by rotating said adjustment screw to raise and lower a distal end of said leaf spring; and a bubble tube carried on said leaf spring for measuring the amount of vertical deviation of the light beam.

\* \* \* \* \*